UNITED STATES PATENT OFFICE.

HUGH A. GALT, OF BARBERTON, OHIO.

PROCESS AND PRODUCT FOR UTILIZING NITER CAKE AND SIMILAR SUBSTANCES.

1,312,782.

Specification of Letters Patent.

Patented Aug. 12, 1919.

No Drawing.

Application filed December 15, 1917. Serial No. 207,286.

*To all whom it may concern:*

Be it known that I, HUGH A. GALT, citizen of the United States, residing at Barberton, in the county of Summit and State of Ohio, have invented certain new and useful Improvements in Processes and Product for Utilizing Niter Cake and Similar Substances, of which the following is a specification.

This invention relates to a process for utilizing niter cake, cylinder cake, or similar substances, and to the novel compound or mixture produced therefrom by said process.

Niter cake is a by-product or residue in several industrial chemical processes, chief among which is the production of nitric acid from sodium nitrate. While it varies somewhat in composition it always contains a large proportion of sodium acid sulfate, $NaHSO_4$, and a smaller proportion of normal sodium sulfate, $Na_2SO_4$. An average analysis of this material may, for example, run as follows:

| | |
|---|---|
| $NaHSO_4$ | 78% |
| $Na_2SO_4$ | 18% |
| Moisture | 4% |
| $FeSO_4$ | Trace. |

Cylinder cake is the commercial name for a similar by-product in the manufacture of hydrochloric acid from sodium chlorid. The proportions of its ingredients may vary but it nevertheless contains a relatively large amount of sodium acid sulfate and a smaller quantity of normal sodium sulfate, for which reason, so far as this invention is concerned, it can be classed as a form or equivalent of niter cake. These substances, because of the sodium acid sulfate content, are strongly acid, niter cake of the composition above stated being substantially the equivalent of sulfuric acid of approximately 32% in strength. When dissolved in hot water it produces an acid solution equivalent to approximately an 18% sulfuric acid solution.

Niter cake is a substance of comparatively low value, being usually classed with waste or worthless substances. It is of some use because of its acid effect, but nevertheless is a growing source of loss because uses have not hitherto been discovered which will take care of the tremendous quantities produced. Indeed, it is a well known fact that niter cake is produced in such large quantities that the investment for dumping land for storing the material is a large item in the cost of industrial processes, as a result of which the material can be had almost for the asking. Manufacturers almost give it away to avoid the labor and expense of handling and storing it. The same is also true of cylinder cake, but to a lesser degree.

The object of the present invention is to provide a use for and conserve these otherwise waste substances or substances of little value by treating the same in a manner to derive benefit or value therefrom, thereby producing a material useful in a variety of ways and converting what has heretofore been a loss and detriment into a source of revenue.

Briefly stated the process consists in compounding or mixing niter cake with a neutralizing base, and preferably with sufficient of said base to neutralize the acid effect of the niter cake. This process avoids certain difficulties encountered in the use and handling of niter cake and enables it to be prepared and stored in practically permanent form ready for use at any time. Niter cake (and by this term I mean to include cylinder cake or any other material containing a large proportion of sodium acid sulfate) is deliquescent. In lump form its surface absorbs water so that it glistens and becomes syrupy. This effect is not so detrimental when the material is in lump form, but it prevents any possibility of grinding up the material to finely divided condition and storing it in such form for later use. The pile or mass of pulverized niter cake absorbs water to such a large degree as to become mushy and even liquid in form. Moreover, finely divided niter cake, after absorption of water will attack and dissolve many foreign substances in contact therewith, such as nails in the bin, as a consequence of which it becomes unsuitable for use in any process where material quantities of iron are objectionable.

The addition to the niter cake of a neutralizing base is found to correct the foregoing and other deficiencies, even though the base is added in such a way as to be merely mechanically mixed with the niter cake and not chemically combined therewith. In other words, the neutralizing base in substantially the quantity calculated to neutralize the acid effect of the niter cake, is ground or pulverized to the same finely divided condition as the niter cake and is thoroughly mixed with the same before the niter cake has an opportunity to absorb water. Such a homogeneous mechanical mixture in dry form is found to be practically permanent, so that the material can be stored or kept in reserve for a long time and will nevertheless remain in suitable condition for use. A slight deliquescent effect may be noticed upon the surface of the pile, but this is merely a "skin" and the effect does not penetrate to any great depth. The underlying material therefore remains in dry pulverized form. Each particle of niter cake seems to be in such close contact with the surrounding particles of the neutralizing base that if any water is absorbed by the niter cake the solution thereof immediately reacts chemically with the neutralizing base, thereby converting that particular particle of sodium acid sulfate into the normal sodium sulfate with the simultaneous production of the sulfate of the neutralizing base. As a result, a pile of this new material, merely mechanically mixed as aforesaid, will not dissolve iron or other neighboring substances and is therefore suitable for use in processes where it otherwise could not be used.

It will of course be understood that if desired a true chemical reaction may be produced between the niter cake and the neutralizing base, such as by mixing the same in the presence of sufficient water to produce solution and the consequent chemical reaction, after which the material may be dried and again pulverized and ground if necessary. The invention however reaches its highest value when the materials are merely mixed mechanically, thereby avoiding the cost of the heat required for drying the mass and the added labor cost for handling the material.

The neutralizing base may take a variety of forms and its particular character will depend largely upon its cost and use for which the mixture is intended. It will therefore always be selected with regard to cost and with the final requirements of the product in mind. Several neutralizing bases will be referred to more in detail.

Recent war activities have created a large demand for what is known as salt cake, which is the commercial form of normal sodium sulfate, $Na_2SO_4$. This material contains little if any acid sodium sulfate. The demand for this material is so heavy that its cost has increased from approximately $10.00 to $12.00 per ton in 1913 to $25.00 to $30.00 per ton today, with a continuing rise. Salt cake is a necessary ingredient of many materials, its uses being well known. By choosing as the neutralizing base for the niter cake a suitable carbonate of sodium, such as either soda ash, $Na_2CO_3$, or commercial bi-carbonate $NaHCO_3$, the niter cake can be converted into a practical equivalent for salt cake. In either case the amount of the carbonate of sodium is calculated to be sufficient to neutralize the acid effect of the particular batch of niter cake. If soda ash is used the amount thereof may vary from 20 to 50% of the quantity of niter cake, and for the same batch of niter cake approximately twice the amount of bi-carbonate of sodium would be required. A mechanical mixture of the carbonate of sodium with the niter cake produces the results before mentioned, to wit, protection of the niter cake from the effects of deliquescence so that a pile of the finely divided mixture is practically permanent and remains dry. When the material is subsequently used in an industrial process, whatever it may be, the first effect of solution or fusion is to produce the chemical reaction between the niter cake and carbonate of sodium, thereby converting the acid sodium sulfate into the normal sulfate with an evolution of carbonic acid gas. Therefore, though the mixture of the two materials may be merely mechanical the compound acts in an industrial process as though it were in fact salt cake. In practice the two ingredients have been so compounded that an analysis thereof is practically identical with that of commercial salt cake. Indeed, the relative purity of the soda ash or bicarbonate used produces a more nearly pure salt cake than other processes from which salt cake is usually derived. Salt cake equivalent can be made in this way at materially lower cost than the market price of ordinary salt cake, due to the relatively lower cost of the niter cake, and enables manufacturers not only to save expense but to continue their several industrial processes without the use of a material the supply of which grows more expensive daily.

It is of course the fact that if desired a true chemical reaction can be initially produced between the two ingredients, such as by adding sufficient water to the mass and subsequently drying it. The product is then true salt cake, although derived from a source and by a method heretofore unknown. This possibility lends the process admirably to the use of the commercial bi-carbonate of sodium produced as an intermediate product in the ammonia soda process for producing soda ash. In this process the treatment of sodium chlorid with ammonium hydrogen carbonate produces sodium hydrogen carbonate or bi-carbonate of soda, which is recovered as a practically pure mass containing about 20% of water. It is usually furnaced to drive off the water and carbonic acid gas to produce soda ash, but can be employed to great advantage in my process by mixing the wet mass directly with ground niter cake. This mixture contains sufficient moisture to produce the chemical reaction, so that drying converts it directly into salt cake.

Another neutralizing base that can be used to advantage in many cases is lime, either slaked or unslaked. This material can be mixed in ground form with the ground niter cake, the product being practically permanent in dry form as before. Lime stone might also be used, but for many purposes such a mixture of lime stone and niter cake would require to be roasted to drive off the $CO_2$ from the lime stone before reaction of the lime base with the niter cake can take place. Similar bases of other metals of the calcium group may also be used, but should be chosen with due regard to cost. Furthermore, the compound of niter cake with the lime base can be a mere mechanical mixture in dry pulverized form, as before described in connection with soda as a base, or it can be a true chemical compound by the production of solution and reaction followed by a drying step.

Niter cake neutralized with a lime base is suitable for use in the manufacture of glass, and indeed, in many other processes, due to the relative low cost of the lime base as compared with the cost of soda ash or bi-carbonate of soda.

The method described enables niter cake, cylinder cake, or like substances containing sodium bi-sulfate to be converted into substances of relatively higher value, so that what has heretofore been a detriment or loss becomes a source of revenue. It also offers to the trade a new material at relatively low cost which answers all the requirements of other substances heretofore used for the same purpose.

What I claim is:—

1. A new material, comprising a mechanical mixture in finely divided form of a substance containing sodium bisulfate and a neutralizing base therefor.

2. A new material, comprising a mechanical mixture in finely divided form of a substance containing sodium bisulfate and a base in substantially sufficient quantity to neutralize the acid effect of the bisulfate.

3. A new material, comprising a mechanical mixture in finely divided form of niter cake and a neutralizing base therefor.

4. A new material, comprising a mechanical mixture in finely divided form of niter cake and a base in substantially sufficient quantity to neutralize the acid effect of the bisulfate.

5. A new material, comprising a mechanical mixture in finely divided form of a substance containing sodium bisulfate and a neutralizing base therefor of the calcium group.

6. A new material, comprising a mechanical mixture in finely divided form of a substance containing sodium bisulfate and a base of the calcium group in substantially sufficient quantity to neutralize the acid effect of the bisulfate.

7. A new material, comprising a mechanical mixture in finely divided form of niter cake and a neutralizing base therefor of the calcium group.

8. A new material, comprising a mechanical mixture in finely divided form of niter cake and a base of the calcium group in substantially sufficient quantity to neutralize the acid effect of the niter cake.

9. A new material, comprising a mechanical mixture in finely divided form of niter cake and lime.

10. A new material, comprising a mechanical mixture in finely divided form of niter cake and lime in substantially sufficient quantity to neutralize the acid effect of the niter cake.

In testimony whereof I affix my signature.

HUGH A. GALT.